Aug. 28, 1945.　　　M. V. MERCER　　　2,383,493
MOTION PICTURE APPARATUS
Filed May 1, 1942　　　4 Sheets-Sheet 1
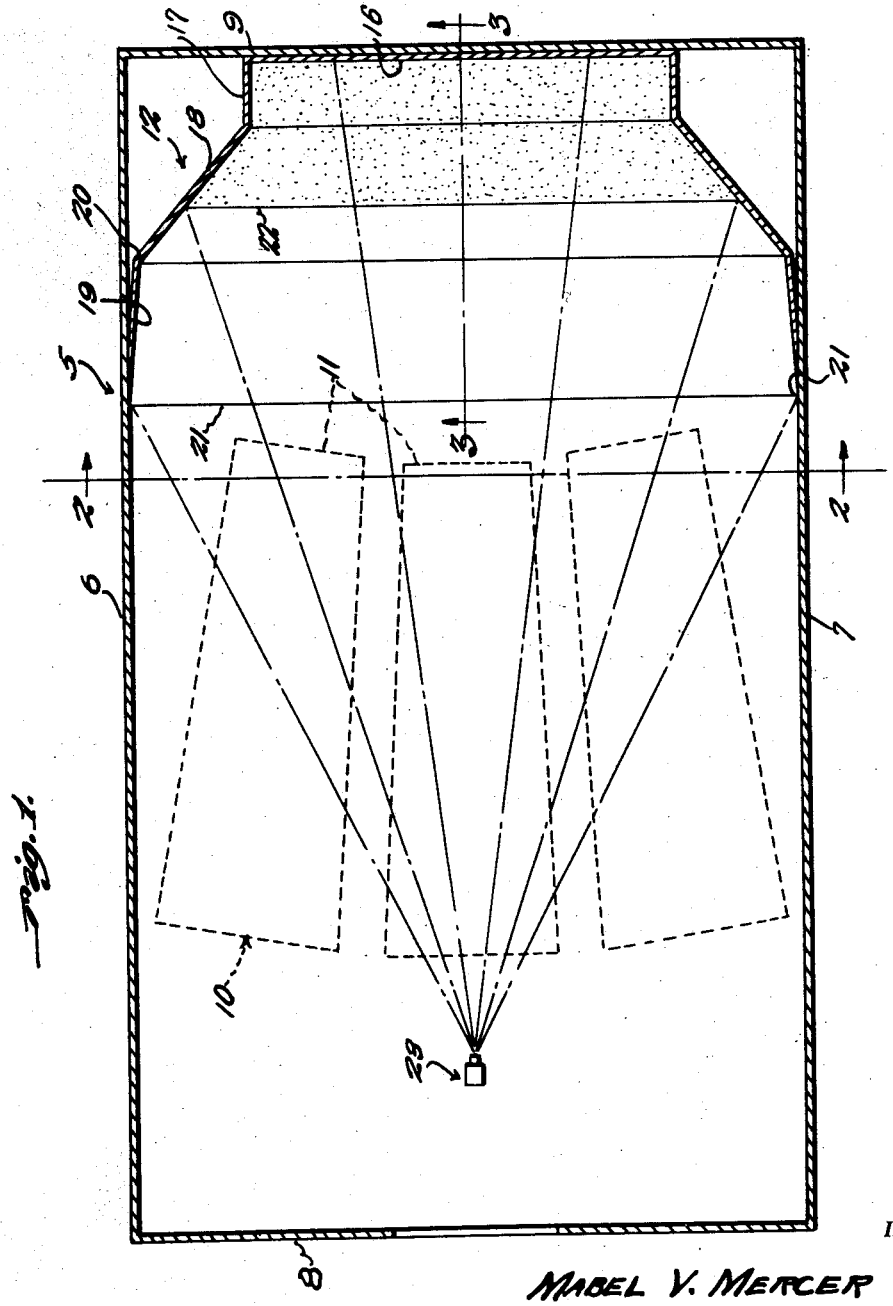

Aug. 28, 1945.  M. V. MERCER  2,383,493
MOTION PICTURE APPARATUS
Filed May 1, 1942  4 Sheets-Sheet 2
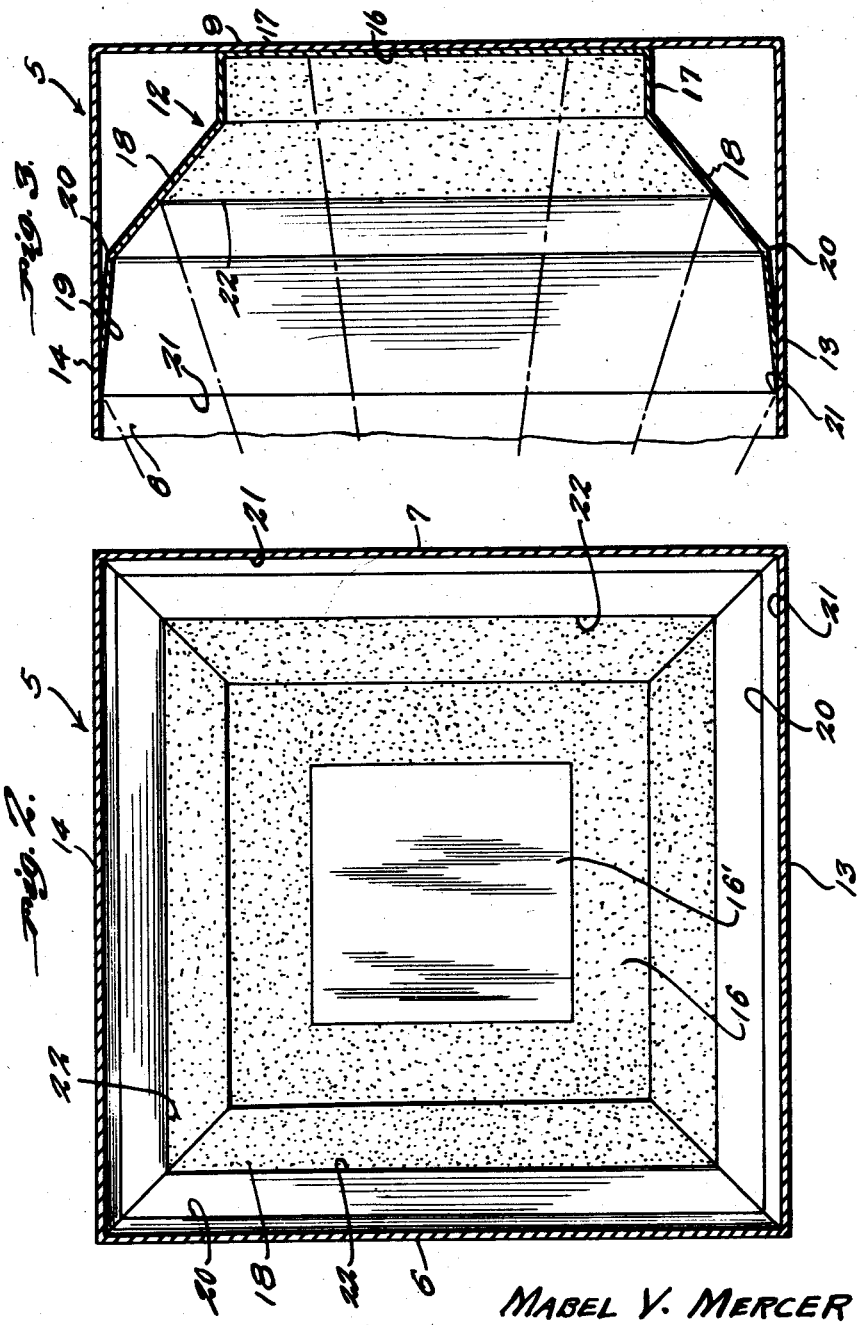
Inventor
MABEL V. MERCER
By *Clarence A. O'Brien and Harvey B. Jacobson*
Attorneys

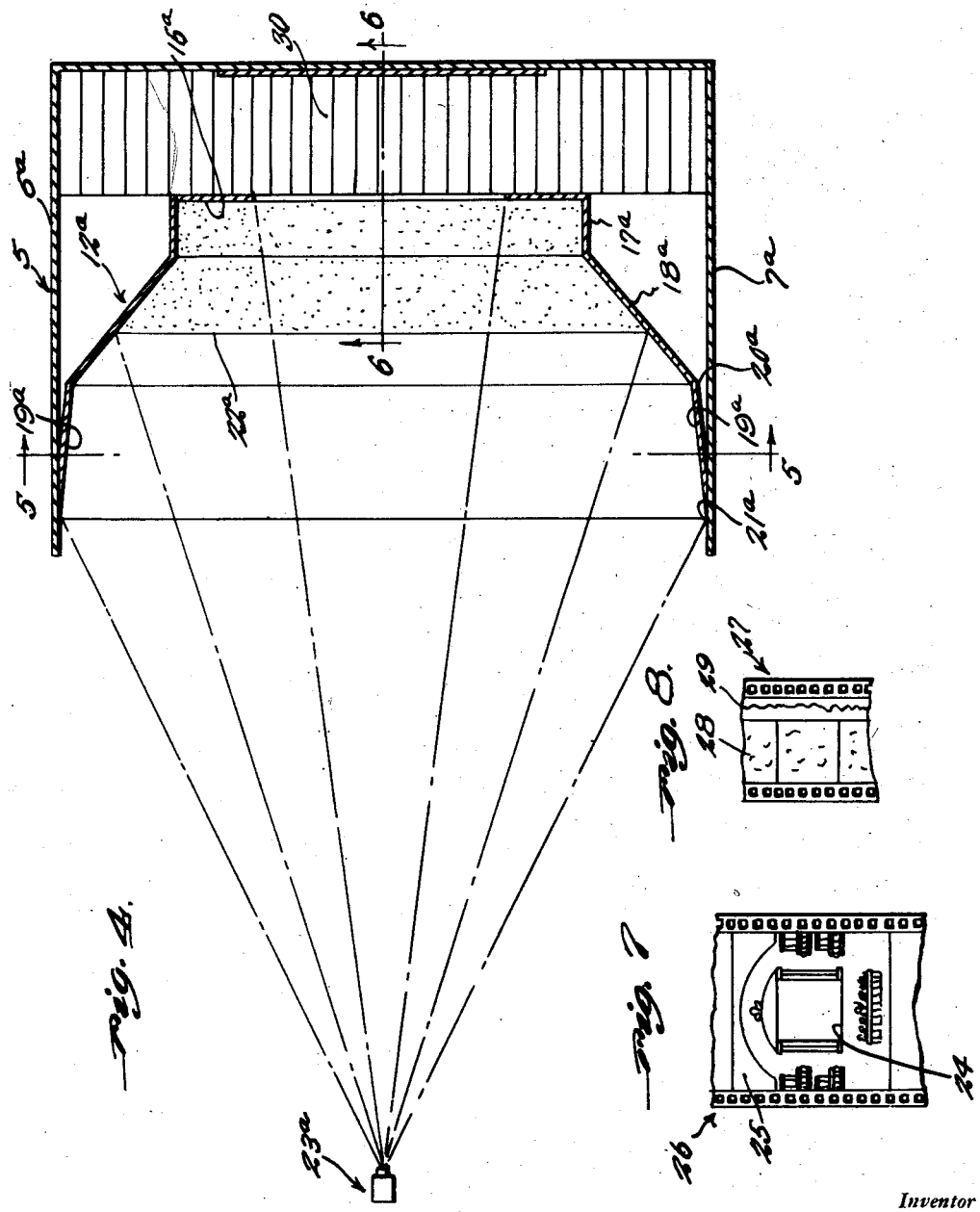

Aug. 28, 1945.   M. V. MERCER   2,383,493
MOTION PICTURE APPARATUS
Filed May 1, 1942   4 Sheets—Sheet 4
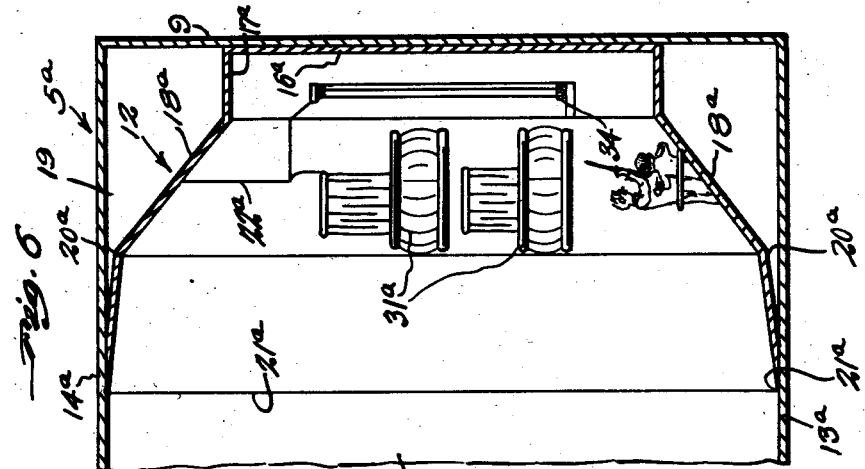
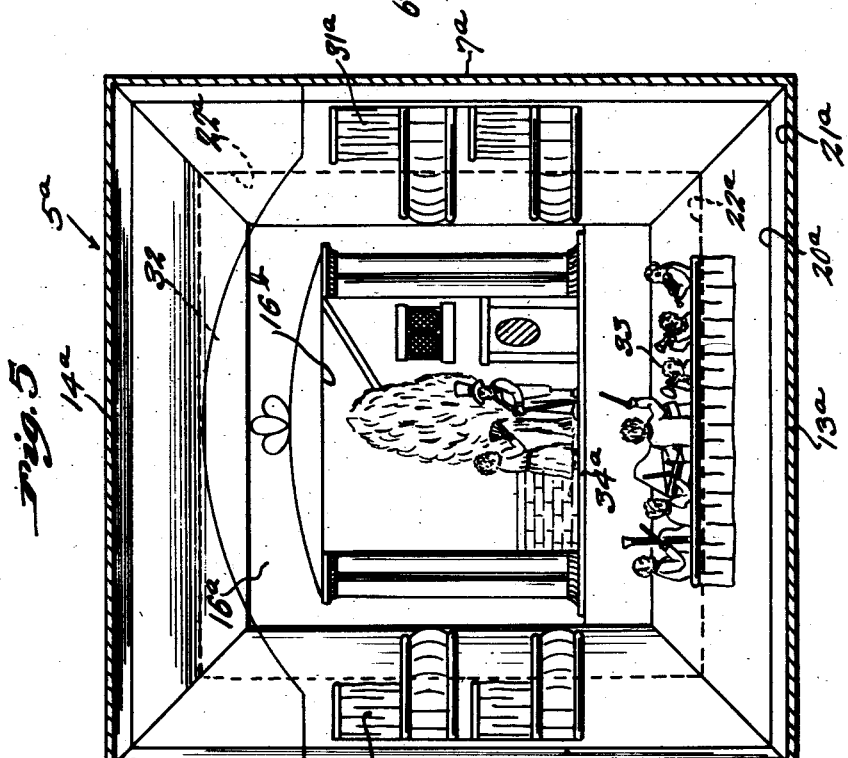
Inventor
MABEL V. MERCER
By Clarence A. O'Brien
and Harvey B. Jacobson
Attorneys Patented Aug. 28, 1945

2,383,493

UNITED STATES PATENT OFFICE 2,383,493

MOTION PICTURE APPARATUS

Mabel V. Mercer, Arlington, Va.

Application May 1, 1942, Serial No. 441,360

4 Claims. (Cl. 88—16)

The invention relates to improvements in apparatus for exhibiting motion pictures, and the primary object of the invention is to provide arrangements whereby the motion pictures are exhibited with an unusual effect of depth and perspective, and within a border or surrounding background projected on a background screen in the theatre surrounding an action screen, whereby the attention of the audience is naturally and restfully concentrated upon the action appearing upon the action screen in an atmosphere or background complementing the nature of the action.

Another important object of the invention is to provide apparatus for the projection of motion pictures whereby the stage portion of a motion picture theatre may be transformed in appearance to blend with or otherwise cooperatively supplement the action and scenery projected on the usual screen, whereby the impression of realism is increased to the point that the audience is led to become unconscious of the theater and its usual stage appurtenances, and has its attention naturally drawn to the visual center of the arrangement.

Other important objects and advantages of the invention will be apparent from a reading of the following description taken in connection with the appended drawings, wherein for purposes of illustration I have shown preferred embodiments of the invention.

In the drawings—

Figure 1 is a general horizontal sectional view taken through a theatre equipped in accordance with the present invention, and showing diagrammatically the method of projection.

Figure 2 is a transverse vertical sectional view taken through Figure 1 along the line 2—2 and looking toward the right in the direction of the arrows.

Figure 3 is a fragmentary longitudinal sectional view taken through Figure 1 along the line 3—3 and looking upwardly in the direction of the arrows.

Figure 4 is a general horizontal sectional view taken through a photographing studio, showing diagrammatically the method of photographing the film therefrom.

Figure 5 is a general transverse vertical sectional view taken through Figure 4 along the line 5—5 and looking toward the right in the direction of the arrows.

Figure 6 is a fragmentary longitudinal sectional view taken through Figure 4 along the line 6—6 and looking upwardly in the direction of the arrows.

Figure 7 is a fragmentary plan view of background projecting film in accordance with the present invention.

Figure 8 is a fragmentary plan view on a reduced scale of action and sound film.

Referring in detail to the drawings, the numeral 5 generally designates a motion picture theatre in accordance with the present invention, which involves side walls 6 and 7, a front wall 8, a rear wall 9 and seats 10 terminating at 11, in substantially spaced relation to the rear wall 9.

In the relatively large space between the forward ends of the seats 10 and the back wall 9 of the theatre is arranged the enlarged specially formed screen which is generally designated as a whole by the numeral 12 and which extends all of the way across the theatre between the side walls 6 and 7 and between the floor 13 and the ceiling 14, as indicated in Figures 1, 2 and 3 of the drawings. The screen 12 replaces the usual stage and adjacent structure and appurtenances of the theatre and involves an action screen 16 which may be of the usual size and proportions of the present screens upon which the action film is projected. The action screen 16 may be located at any suitable elevation with respect to the floor 13, but is preferably centralized with respect to the screen 12 as a whole and has a rectangular centralized action area 16', as shown in Figure 2. Forwardly projecting from the side edges of the action screen 16 is the abbreviated wall 17 which extends along the top, bottom and opposite sides of the action screen, the forward edges of the wall 17 merging into flaring relatively wide top, bottom and opposite side walls 18. As seen in Figures 1 and 3 the walls 18 terminate at their forward edges in walls 19 which flare forwardly at a smaller angle than the walls 18. The walls 19 which begin at the junction point 20 with the wall 18 extend to feather into the side walls 6 and 7 and into the floor 13 and ceiling 14 at the points indicated by the numeral 21, in a manner to form an unbroken continuation of the side walls, the floor and the ceiling of the theatre.

The exposed faces of the various walls described may be whitened and be of substantially the same material as the action screen 16, that is, of conventional projection screen material, or the screen 12 except the action screen 16 may be of varied colors and/or designs. In a contemplated arrangement of the invention the exposed faces of the walls 19 may have thereon the same color and design as those of the side walls 6 and 7 and the ceiling 14 of the theatre so as to seem to be unbroken continuations thereof, with the bottom area of the walls 19 suitably blended with the floor 13. The coloring of the walls 19 is continued onto the walls 18 as far as the line 22.

It is further contemplated, in an arrangement of the screen 12 wherein the exposed faces of the screen are not white or of ordinary screen material, that the portions of the walls 18 located rearwardly from the line 22 may be of a color contrasting to the exposed faces of the walls 19, in accordance with the type of illusory background it is desired to provide for the action screen 16 and the action projected thereon. Under ordinary circumstances the color of the action screen, of the walls 17, and of the walls 18, as far as the line 22 will be uniform and of conventional motion picture screen type.

The background or atmosphere on the screen 12 may be produced by representing such background directly on the walls of the screen or by having for the entire screen a plain reflecting surface like an ordinary motion picture screen, and providing the background or atmosphere thereon by projecting the same thereon in the same way that the action is projected on the action screen 16. In such an arrangement a projector means 23, usually arranged in the rear of the seats 10 in the theatre 5, is employed in the usual manner, and the said projector means may comprise more than one projector.

One method contemplated for simultaneously projecting the action on the action screen 16 and the background or atmosphere on the remaining portions of the screen 12 is to utilize a single projector with a single film sufficiently enlarged to contain in its frames both the background and the action and the sound track, with these combinations on succeeding frames or with the action and the background on alternate frames of the film.

Another arrangement contemplated is the use of two projectors, one utilizing film whose frames contain only the background, with a blank space 24 corresponding to the action area located within the background area 25 as indicated in Figure 7 of the drawings, the film being designated 26, and the other projector utilizing a film 27 whose frames contain only the action area 28 and the sound track 29, the two projectors being synchronized and arranged so that the background and the action are projected in synchronism on the screen 12 with the action appearing on the action screen 16.

Two or more projectors are employed, one of which projects the action on the screen 16, and the others project different background effects on the remaining portion of the screen 12.

Referring to Figures 4 through 6 of the drawings, showing a studio set up for photographing film to be utilized in accordance with the present invention, a screen form 12a conforming in proportions and arrangement with the screen 12 may be provided, with the action screen 16 replaced by a similarly sized opening 16a behind which is arranged a stage or platform 30 on which the actors perform before the camera, framed by the opening 16a.

The camera means 23a, which may comprise a single camera or several cameras in accordance with the number of projectors contemplated for use in projecting the background and the action on the screen 12, is arranged in front of the screen 12a, the camera means being arranged to photograph not only the action taking place on the stage 30 within the opening 16a, but the background or atmosphere which is pre-arranged on the opposed faces of the walls 17a, 18a, and 19a on the screen 12a.

The desired coloring, designs or forms may be produced on the walls of the screen 12a in any desired way. The invention contemplates the production of such visual forms on the screen 12a by painting, photographing, or in any other way reproducing thereon the desired appearances, including dummy or real forms.

As illustration of this aspect of the invention reference is had to Figures 5 and 6 of the drawings which are intended to show not only the studio 5a but to show the theatre 5 with background and action projection arrangement. Supposing the illusion desired to be created in connection with the projection of a motion picture of an opera, is that it is taking place on the stage of another theatre, such as a famous opera house, the side boxes 31a would be reproduced in form or by painting or otherwise on the sides of the screen walls 18a and 19a, with the proscenium arch similarly reproduced on the upper portions of the walls 18a and 19a, an orchestra pit and orchestra 33 on the lower portions of the walls 18a and 19a, and other portions including the stage 34, similarly reproduced on other portions of the screen 12a of the studio set up and subsequently projected on the screen 12 of the theatre, with the action portion 16 provided by the living actors on the stage 30 when photographed and said action appearing on the screen 16 in the theatre when projected, the whole giving the audience in the theatre 5 the illusion of sitting in the opera house or other theatre and witnessing the performance of an opera played by living actors.

The production of the background or atmosphere is also provided for by photographing the same from an actual scene, such as by direct photographing of the herein exemplified opera house, or by any other means of producing the film for projection on the screen 12 of the motion picture theatre.

From the above it will be observed that not only the augmenting of the showing of ordinary moving pictures in a motion picture theatre is provided for, but also the creation of illusion in an ordinary motion picture theatre of witnessing a performance in another theatre, both exhibitions of the motion picture action being characterized by the optical illusion of unusual depth produced upon the audience by the converging surfaces provided by the flaring sides of the screen 12, compellingly but restfully concentrating the vision of the audience upon the centralized action screen, while eliminating from the consciousness of the audience the usual theatre appearance and theatre trappings.

Although preferred embodiments of the apparatus of the invention are shown and set forth herein, it is to be understood that it is not desired to limit the application of the invention specifically thereto except as may be required by the scope of the subjoined claims.

Having described the invention, what is claimed as new is:

1. A motion picture theatre comprising a room having opposite side walls, a ceiling, and a floor, the ceiling extending between the upper ends of the side walls, and the floor extending between the lower ends of the side walls, a composite screen forming the rear wall of the room and extending across the room between the side walls and ceiling and floor of the room, said composite screen comprising marginal portions arranged at forwardly divergent angles and merging into the side walls, the ceiling, and the floor of the room.

2. A motion picture theatre comprising a room having opposite side walls, a ceiling, and a floor, the ceiling extending between the upper ends of the side walls, and the floor extending between the lower ends of the side walls, a projection screen forming the rear wall of the room, said screen comprising a main area extending crosswise of the room and spaced at its edges from the side walls and ceiling and floor of the room, said projection screen further comprising a background area converging forwardly from the side walls, ceiling, and floor of the room to the corresponding edges of the main area, said background area consisting of substantially plane portions arranged at acute angles with respect to the side walls, ceiling and floor of the room causing convergence of the vision of the audience upon the main area, and projection means for simultaneously projecting action upon said main area of the screen and background upon said background area and merging into the main area and conforming in theme to the action projected on the main area, whereby an illusion of depth and of not being in a theatre is produced upon the audience.

3. A motion picture theatre, according to claim 1, wherein said marginal portions of the composite screen comprise at least two plane portions arranged at different angles and convergent with respect to the remainder of the composite screen, whereby the said marginal portions merge stepwise into the side walls, the ceiling, and the floor of the room.

4. A motion picture theatre, according to claim 2, wherein said substantially plane portions of the background area comprise at least two plane faces arranged in angular relation to each other and generally converging toward said main area.

MABEL V. MERCER.